US009191562B1

(12) United States Patent
Schorr, II

(10) Patent No.: US 9,191,562 B1
(45) Date of Patent: Nov. 17, 2015

(54) OPTICAL ADAPTER FOR MOBILE MEDIA DEVICES WITH A CAMERA

(71) Applicant: Robert W. Schorr, II, Columbus, OH (US)

(72) Inventor: Robert W. Schorr, II, Columbus, OH (US)

(*) Notice: Subject to any disclaimer, the term of this patent is extended or adjusted under 35 U.S.C. 154(b) by 22 days.

(21) Appl. No.: 14/292,525

(22) Filed: May 30, 2014

(51) Int. Cl.
  *H04N 5/225* (2006.01)
  *G03B 17/56* (2006.01)
  *G02B 7/00* (2006.01)
  *H04N 1/00* (2006.01)

(52) U.S. Cl.
  CPC .............. *H04N 5/2254* (2013.01); *G02B 7/003* (2013.01); *G03B 17/566* (2013.01); *H04N 1/00246* (2013.01)

(58) Field of Classification Search
  CPC . H04N 5/2254; H04N 1/00246; G02B 7/003; G02B 21/24; G03B 17/566; G03B 17/561; G03B 17/563; H04M 1/04; H04M 1/11; A45F 5/00
  See application file for complete search history.

(56) References Cited

U.S. PATENT DOCUMENTS

| 9,122,131 | B2* | 9/2015 | Coppage | G03B 17/561 |
| 2012/0320340 | A1* | 12/2012 | Coleman, III | A61B 3/10 351/208 |
| 2013/0016963 | A1* | 1/2013 | Miller | G02B 21/362 396/428 |
| 2013/0327909 | A1* | 12/2013 | Freelander | A45F 5/00 248/224.7 |
| 2013/0331148 | A1* | 12/2013 | Brough | G06F 1/1632 455/557 |
| 2014/0072362 | A1* | 3/2014 | Hyers | F16B 21/065 403/24 |
| 2014/0221055 | A1* | 8/2014 | Wu | H04M 1/0281 455/575.6 |
| 2014/0226965 | A1* | 8/2014 | Fujikake | G03B 17/566 396/544 |
| 2014/0253800 | A1* | 9/2014 | Mcleod | F16M 13/022 348/376 |
| 2015/0042873 | A1* | 2/2015 | Hunt | H04N 5/2254 348/373 |
| 2015/0054935 | A1* | 2/2015 | Muramatsu | G02B 21/24 348/79 |
| 2015/0195392 | A1* | 7/2015 | Nissenbaum | H04M 1/04 455/569.1 |

* cited by examiner

*Primary Examiner* — Aung S Moe
(74) *Attorney, Agent, or Firm* — Miracle IP; Bryce D. Miracle

(57) ABSTRACT

An optical adapter for secure and adjustable mounting of a mobile media device having a camera lens to an optical eyepiece of an optical device. The adapter having the ability to quickly and reliably attach a mobile media device such as smart phone, iPhone, Droid, etc. to a wide range of various diameter optical devices such as binoculars, birding scopes, excavation scopes, microscopes and telescopes. The optical adapter comprises a flat base plate having a central aperture for passing light and a plurality of aligned openings, an adjustable strap which is woven within the plurality of aligned openings in order to secure the mobile media device, and an adjustable optical eyepiece attachment assembly which provides secure attachment to an optical eyepiece.

14 Claims, 4 Drawing Sheets

OPTICAL ADAPTER FOR MOBILE MEDIA DEVICES WITH A CAMERA

BACKGROUND

The present invention pertains to optical accessories and, in particular, an adapter that can be utilized to attach a mobile media device with a camera to an optical eyepiece of an optical device.

Optical instruments process light waves to enhance an image for viewing—such as a microscope or telescope. A telescope is used for magnification of distant images and a microscope is used for magnifying very small images. Optical instruments are widely utilized for many recreational purposes such as star gazing at night, hunting wild game, or bird watching. On the other hand, optical instruments are well utilized within the scientific community in order to make new discoveries and advance the progress of science.

Mobile media devices, such as an iPhone, Droid, etc., have the ability to capture still images and video by an integrated camera within the mobile media device. These devices have the ability to point and shoot and capture a variety of images and video for storage on the device which later can be transferred and stored on other computer devices.

However, these mobile media devices with cameras are not well suited to capture images from an eyepiece of an optical device. The camera lens of the mobile media device must be carefully and accurately aligned with the optical eyepiece in order to receive an optimal image. This can make aligning the mobile media device with the optical eyepiece by hand an awkward task. The user must first make the proper alignment, hold the position, and then record the picture without moving. The user may have to carry out this process several times before getting a successful picture of the subject matter.

Moreover, optical eyepieces range in diameter and size—forcing the user to make small adjustments when aligning the camera lens with the optical eyepiece.

The present invention provides an apparatus for reducing these problems. The difficulties inherent in the art are therefore overcome in a way which is simple, user friendly, and efficient—which will provide better and more advantageous results.

SUMMARY

For the foregoing reasons, what is needed is to provide an optical adapter for secure and adjustable mounting of a mobile media device having a camera lens to an optical eyepiece of an optical device. The adapter having the ability to quickly attach a mobile media device such as an iPhone, Droid, Smart Phone, etc. to a wide range of various diameter optical devices such as binoculars, birding scopes, excavation scopes, microscopes and telescopes. The adapter can attach to optical eyepieces ranging in size from very small microscopes to the larger laboratory microscope eyepieces and all types in between.

In accordance with the invention, a an optical adapter for secure and adjustable mounting of a mobile media device having a camera lens to an optical eyepiece of an optical device for capturing images from the optical device to the mobile media device is provided. The optical adapter has a flat base plate having a front side and a back side. The flat base has a central aperture for passing light having a central axis and a plurality of aligned openings which pass through the flat base plate from the front side to the back side.

The optical adapter further includes an adjustable strap which provides secure attachment of the mobile media device to the front side of the flat base while the camera lens is aligned with the central aperture. The adjustable strap can be adjusted to fit a plurality of mobile media devices by operably weaving it within the plurality of aligned openings and then around the mobile media device, holding the mobile media device in the proper position in order to align the camera lens with the central aperture.

Moreover, the version further comprises an adjustable optical eyepiece attachment assembly which provides a secure attachment of the optical adapter to an optical eyepiece of an optical device. The adjustable optical eyepiece attachment assembly comprises a plurality of longitudinally adjustable members each having a contact end. The plurality of longitudinally adjustable members are positioned near the back side of the flat base plate and are radially aligned about the central axis of the central aperture. The radial position of each contact end can be adjusted relative to the central axis in order to collectively receive and grip an optical eyepiece of an optical device while simultaneously aligning the optical eyepiece with the central aperture. This enables light to freely pass from the optical eyepiece through the central aperture allowing the mobile media device to view the image to be captured.

In a version of the invention, the adjustable optical eyepiece attachment assembly may further comprise a support bracket for each of the longitudinally adjustable members. Each support bracket has a threaded opening longitudinally aligned towards the central axis of the central aperture with each longitudinally adjustable member having matching threading. Each longitudinally adjustable member is supported and adjusted by threading into the corresponding support bracket. This enables adjustment of the longitudinal position of the contact ends by rotating the longitudinal adjustable members in either direction which moves the contact end towards the central axis or away from the central axis in order to adapt and fit various sized optical eyepiece diameters.

In other version of the invention, an optional buckle attached to the flat base plate may be utilized for receiving and securing the adjustable strap. Moreover, the buckle in conjunction with the plurality of aligned openings operate to adjust and secure the adjustable strap about the mobile media device which maintains the position of the camera lens relative to the central aperture.

In other versions of the invention, it may be preferable to include a front padding on the front side of the flat base plate for providing a cushion between the mobile media device and the optical adapter and a back padding on the back side of the flat base plate for providing a cushion between the mobile media device and the eyepiece of the optical device.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
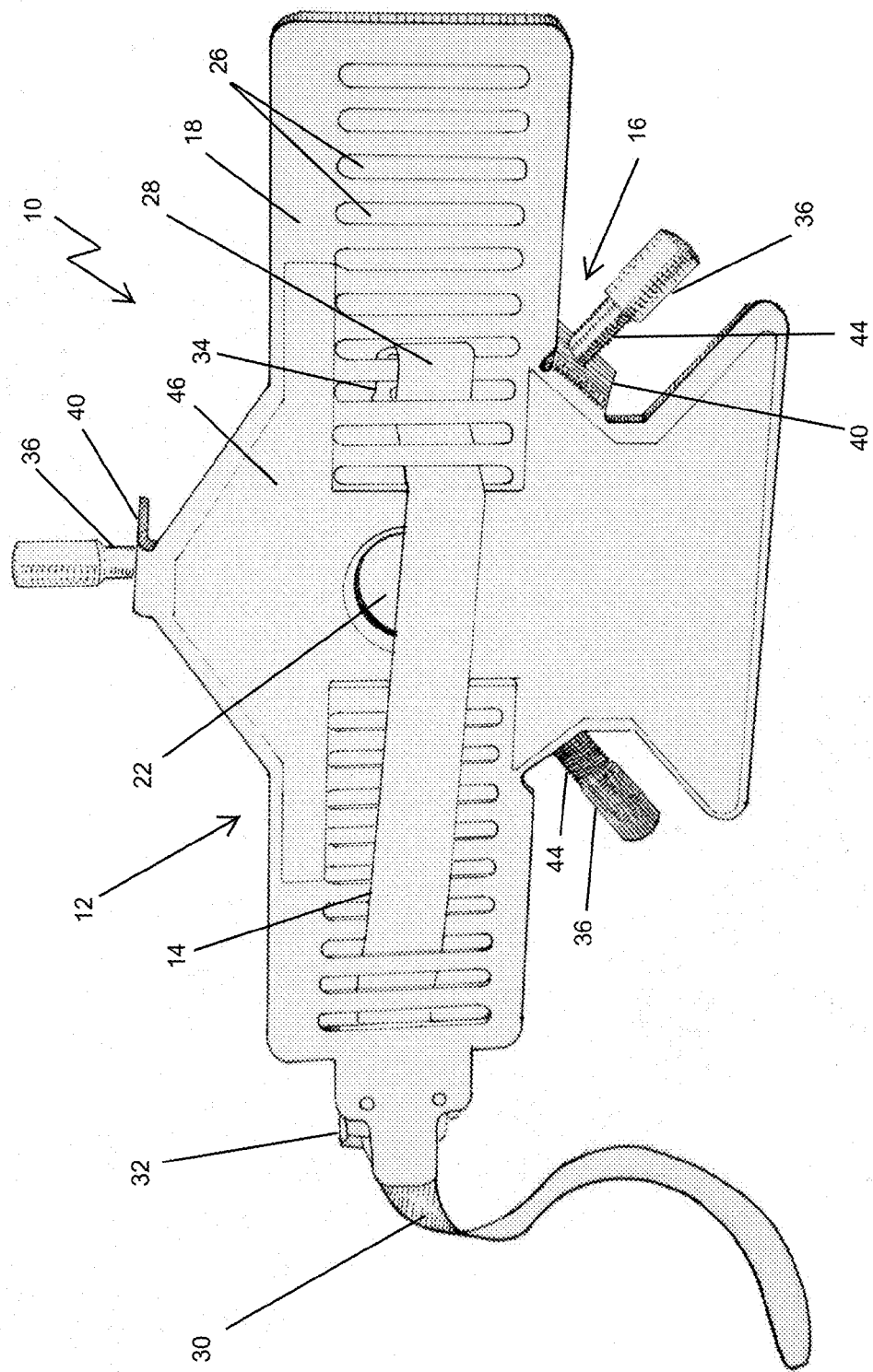
FIG. 1 is a front, perspective view of a version of the present invention.

Referring now to the drawings wherein the showings are only for purposes of illustrating a preferred version of the invention and not for purposes of limiting the same.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

With reference now to the drawings, a version of a new optical adapter 10 is disclosed for secure and adjustable mounting of a mobile media device to an optical eyepiece of an optical device for capturing images.

Figure 2:
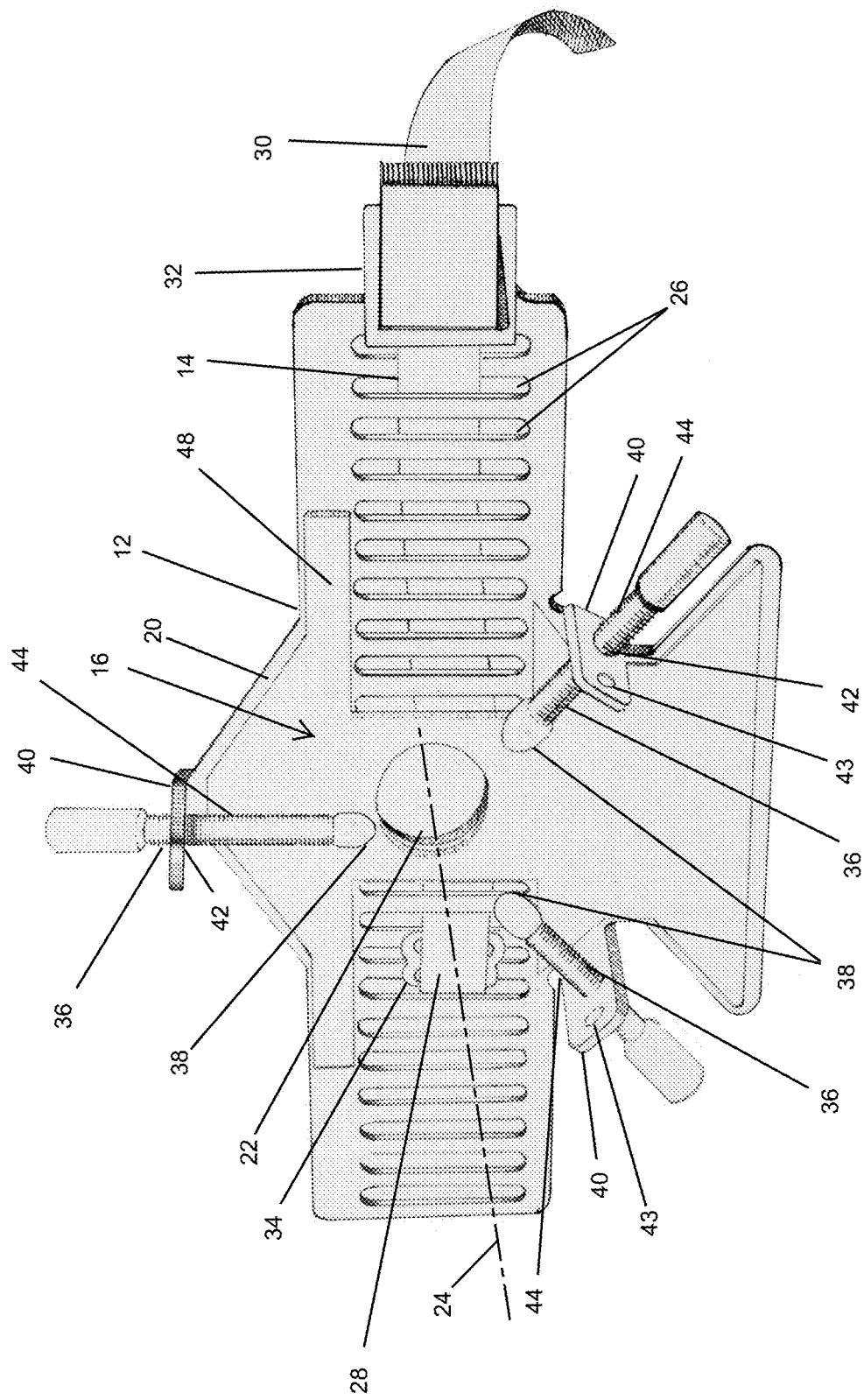
FIG. 2 is a rear, perspective view of the version shown in FIG. 1.

As best illustrated in FIG. 1 and FIG. 2, optical adapter generally comprises a flat base plate 12, an adjustable strap 14 for securing a mobile media device, and an adjustable optical eyepiece attachment assembly 16 for providing secure attachment to an optical eyepiece.

The flat base plate 12 has a front side 18 and a back side 20, a central aperture 22 having a central axis 24 and a plurality of aligned openings 26 which in the version are vertically elongated slots 26.

The central aperture 22 is generally circular and can be of any size that is sufficient to allow light to pass through the flat base plate 12. As depicted by FIG. 1, the central aperture 22 has a central axis 24 that passes through the center of the central aperture 22 and is generally perpendicular to the surface of the flat base plate base 12.

In the version, the adjustable strap 14 has a first end 28 and a second end 30 for providing secure attachment of the mobile media device to the front side 18 of the flat base plate 12. The strap is woven within the plurality of vertical elongated slots 26 in order to fit a plurality of mobile media devices and secured into place by buckle 32 and a means for connecting 34. The adjustable strap can be made of any material that is flexible such as a thermoplastic polyurethane material. The buckle 32 can be a standard nylon cam buckle and the means for connecting 34 can be a standard nylon tri glide. The means for connecting 34 can be any device that attaches or maintains the adjustable strap 14 to the flat base plate 12.

As illustrated by FIG. 2, the adjustable optical eyepiece attachment assembly 16 comprises a plurality of longitudinally adjustable members 36 each having a contact end 38, the plurality of longitudinally adjustable members 36 are positioned near the back side 20 of the flat base plate 12 and are radially aligned about the central axis 24 of the central aperture 22, wherein the radial position of each contact end 38 can be adjusted relative to the projected central axis 24 in order to collectively receive and grip an optical eyepiece of an optical device while simultaneously aligning the optical eyepiece with the central aperture 22, whereby light freely passes from the optical eyepiece through the central aperture 22.

As illustrated, the adjustable optical eyepiece attachment assembly 16 further comprises a support bracket 40 for each of the longitudinally adjustable members 36, each support bracket 40 having a threaded opening 42 longitudinally aligned towards the central axis 24 of the central aperture 22 and each longitudinally adjustable member 36 having matching threading 44. Each longitudinally adjustable member 36 is supported and adjusted by threading into corresponding support bracket 40. The longitudinal position of the contact ends 38 is adjusted by rotating the longitudinal adjustable members 36 in either direction in order to move the contact end 38 towards the projected central axis 24 or away from the central axis 24 in order to adapt to various sized optical eyepiece diameters.

Optionally, each support bracket 40 may include an additional set of threaded openings 43 positioned outward the set of threaded openings 42. The additional threaded openings 43 are positioned to receive and maintain respective longitudinally adjustable members 36 at a greater distance from the base plate 12 in order to grip alternative optical eyepiece lengths and sizes.

Preferably, as illustrated, the flat base plate 12 can further have a front layer of padding 46 for providing a cushion between the mobile media device and the optical adapter; and a back padding 48 for providing a cushion between the mobile media device and the eyepiece of the optical device. The front padding 46 and back padding 48 can preferably be made of an adhesive backed foam or an adhesive backed silicone pad.

Figure 3:
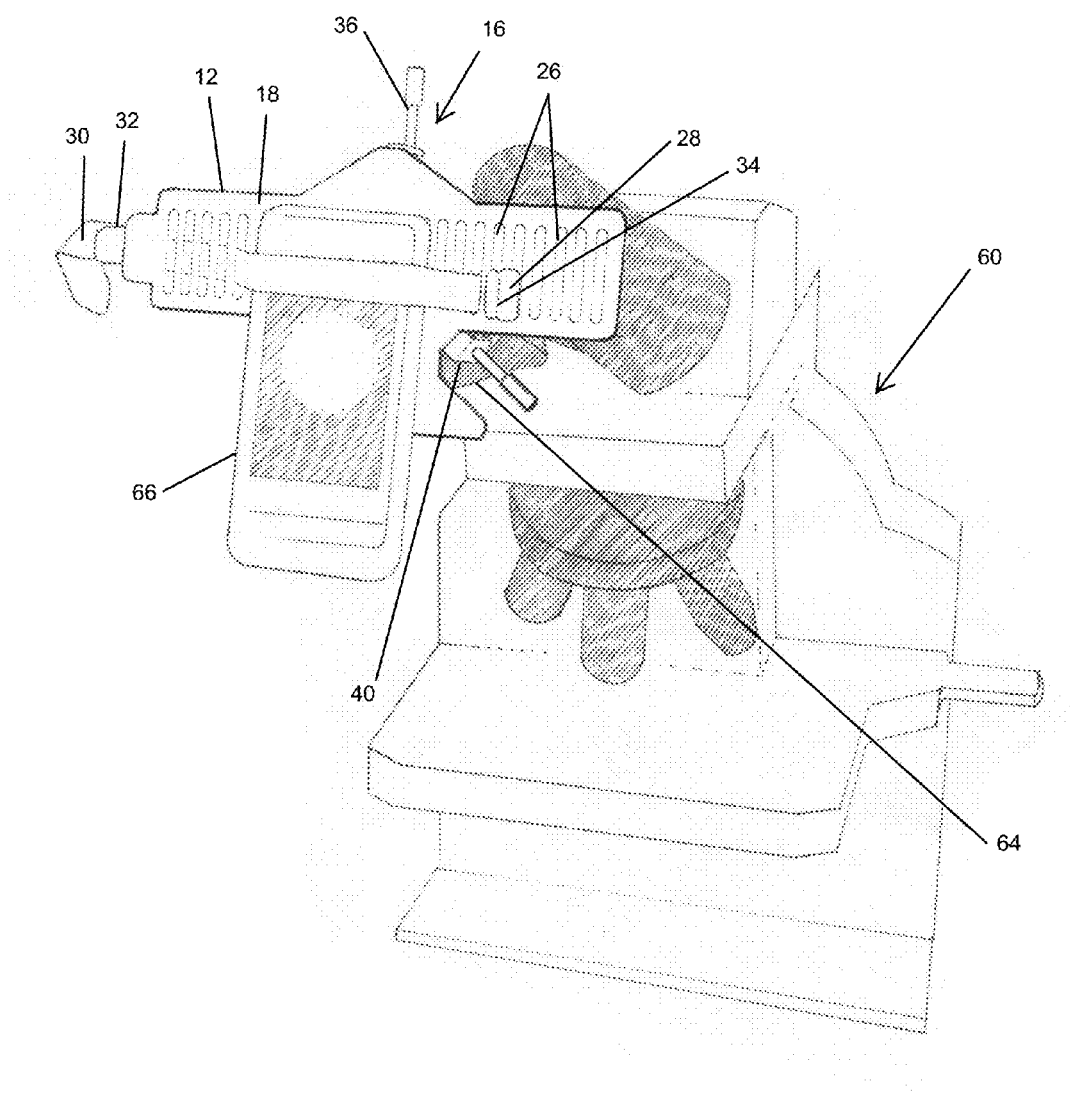
FIG. 3 illustrates the use of the version shown in FIG. 1 attached to a microscope.
Figure 4:
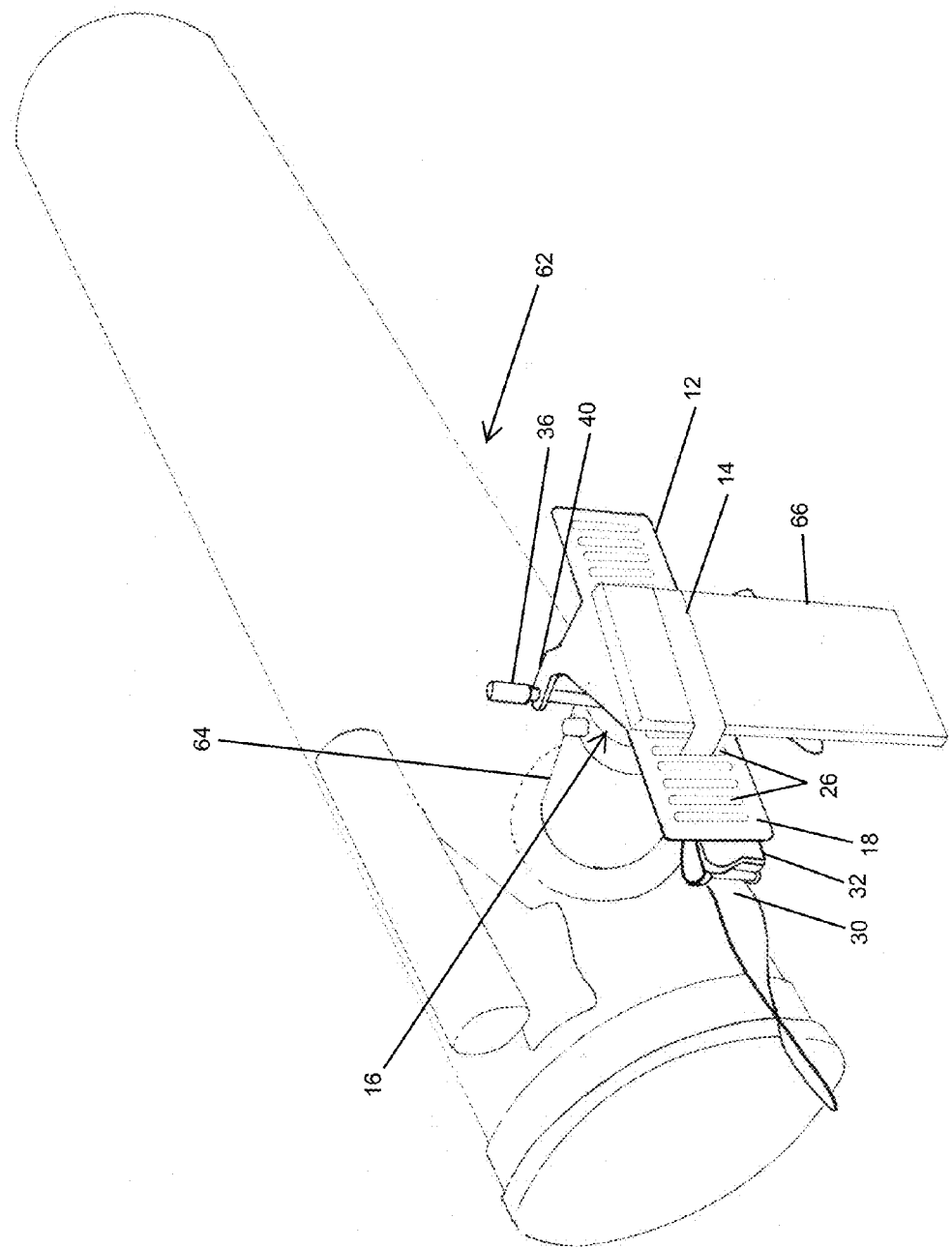
FIG. 4 illustrates the use of the version shown in FIG. 1 attached to a telescope.

Now referring to FIG. 3 and FIG. 4, the method of operation of the version 10 will be described. FIG. 3 and FIG. 4 illustrate the use of the version 10 attached to the eyepiece 64 of a microscope 60 (FIG. 3) or a telescope 62 (FIG. 4). A mobile media device 66 having a camera lens is attached to the front side 18 of the flat base plate 12, aligning the camera lens with the central aperture 22. The adjustable strap 14 is advantageously woven within the plurality of aligned openings 26 to securely fit the width of the mobile media device 66 and secured tightened around the mobile media device 66 by the buckle 32 in order to provide a secure, reliable attachment.

Further, the version 10 is attached to the optical eyepiece 64 by the adjustable optical eyepiece attachment assembly 16. The central aperture 22 is aligned and attached to the optical eyepiece 64 by adjusting the position of each of the plurality of longitudinally adjustable members 36 in order to collectively receive and grip the optical eyepiece 64 of the optical device while simultaneously aligning the optical eyepiece 64 with the central aperture 22. Thereby, allowing light to freely pass from the optical eyepiece 64 through the central aperture 22 and into the camera lens of the mobile media device 66. At this point, the user can elect to make the proper optical eyepiece 64 adjustments and mobile device 66 photographic adjustments in order to focus and record an image or video onto the mobile media device 66.

The present invention can be made in any manner and of any material chosen with sound engineering judgment. Preferably, materials will be strong, lightweight, long lasting, economic, and ergonomic such as plastic or metal or a combination thereof.

The previously described versions of the present invention have many advantages, including providing an optical adapter that easily and efficiently attaches a mobile media device to an optical eyepiece in order to capture video or an image. The adapter can be adjusted to fit a wide range of mobile media device sizes and a wide range of optical eyepiece sizes. The optical adapter is simple, long lasting, durable, collapsible, and adjustable.

The invention does not require that all the advantageous features and all the advantages need to be incorporated into every version of the invention.

Although preferred versions of the invention have been described in considerable detail, other versions of the invention are possible.

All the features disclosed in this specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. An optical adapter for secure and adjustable mounting of a mobile media device having a camera lens to an optical eyepiece of an optical device for capturing images from the optical device to the mobile media device, the optical adapter comprising:
   (a) a flat base plate having a front side and a back side, comprising:
      (i) a central aperture for passing light having a central axis; and
      (ii) a plurality of aligned openings passing through the flat base plate from the front side to the back side;
   (b) an adjustable strap having a first end and a second end for providing secure attachment of the mobile media device to the front side of the flat base plate while the camera lens is aligned with the central aperture, wherein the adjustable strap is operably connected to and woven within the plurality of aligned openings in order to fit a plurality of mobile media device sizes; and
   (c) an adjustable optical eyepiece attachment assembly for providing secure attachment of the optical adapter to an optical eyepiece, comprising:
      (i) a plurality of longitudinally adjustable members each having a contact end, the plurality of longitudinally adjustable members are positioned near the back side of the flat base plate and are radially aligned about the central axis of the central aperture, wherein the radial position of each contact end can be adjusted relative to the central axis in order to collectively receive and grip an optical eyepiece of an optical device while simultaneously aligning the optical eyepiece with the central aperture, whereby light freely passes from the optical eyepiece through the central aperture.

2. The optical adapter of claim 1, wherein the adjustable optical eyepiece attachment assembly further comprises a support bracket for each of the longitudinally adjustable members, each support bracket having a threaded opening longitudinally aligned towards the central axis of the central aperture and each longitudinally adjustable member having matching threading, wherein each longitudinally adjustable member is supported and adjusted by threading into corresponding support bracket, whereby the longitudinal position of the contact ends is adjusted by rotating the longitudinal adjustable members either direction in order to move the contact end towards the central axis or away from the central axis.

3. The optical adapter of claim 2, wherein the flat base plate further comprises a buckle for receiving an end of the adjustable strap, wherein the buckle in conjunction with the plurality of aligned openings operate to adjust and secure the adjustable strap about the mobile media device, whereby maintaining the position of the camera lens relative to the central aperture.

4. The optical adapter of claim 3, wherein the flat base plate further comprises a front padding for providing a cushion between the mobile media device and the optical adapter; and a back padding for providing a cushion between the mobile media device and the eyepiece of the optical device.

5. The optical adapter of claim 2, wherein the optical adapter further comprises a means for connecting the first end of the strap to a first side of the flat base plate and wherein the flat base plate further comprises a buckle on a second side for receiving the second end of the adjustable strap, wherein the means for connecting and the buckle operate to adjust and secure the adjustable strap about the mobile media device in conjunction with the plurality of aligned openings, whereby maintaining the position of the camera lens relative to the central aperture.

6. The optical adapter of claim 5, wherein the flat base plate further comprises a front padding for providing a cushion between the mobile media device and the optical adapter; and a back padding for providing a cushion between the mobile media device and the eyepiece of the optical device.

7. The optical adapter of claim 1, wherein the flat base plate further comprises a buckle for receiving an end of the adjustable strap, wherein the buckle in conjunction with the plurality of aligned openings operate to adjust and secure the adjustable strap about the mobile media device, whereby maintaining the position of the camera lens relative to the central aperture.

8. The optical adapter of claim 7, wherein the flat base plate further comprises a front padding for providing a cushion between the mobile media device and the optical adapter; and a back padding for providing a cushion between the mobile media device and the eyepiece of the optical device.

9. The optical adapter of claim 1, wherein the optical adapter further comprises a means for connecting the first end of the strap to a first side of the flat base plate and wherein the flat base plate further comprises a buckle on the second side for receiving the second end of the adjustable strap, wherein the means for connecting and the buckle operate to adjust and secure the adjustable strap about the mobile media device in conjunction with the plurality of aligned openings, whereby maintaining the position of the camera lens relative to the central aperture.

10. The optical adapter of claim 9, wherein the flat base plate further comprises a front padding for providing a cushion between the mobile media device and the optical adapter; and a back padding for providing a cushion between the mobile media device and the eyepiece of the optical device.

11. The optical adapter of claim 10, wherein the adjustable strap is made of thermoplastic polyurethane.

12. The optical adapter of claim 1, wherein the aligned openings are vertical elongated slots aligned across the flat base plate.

13. An optical adapter for secure and adjustable mounting of a mobile media device having a camera lens to an optical eyepiece of an optical device for capturing images from the optical device to the mobile media device, the optical adapter comprising:
   (a) a flat base plate having a front side and a back side, comprising:
      (i) a central aperture for passing light having a central axis; and
      (ii) a plurality of vertical elongated slots passing through the flat base plate from the front side to the back side;
   (b) an adjustable strap having a first end and a second end;
   (c) a buckle fixedly connected to the flat base plate for receiving the first end of the adjustable strap, wherein the adjustable strap is operably connected to and woven within the plurality of vertical elongated slots and wherein the adjustable strap is adjusted and secured in place by the buckle in order to fit a plurality of mobile media device, whereby maintaining the position of the camera lens relative to the central aperture;
   (d) an adjustable optical eyepiece attachment assembly for providing secure attachment of the optical adapter to an optical eyepiece, comprising:
      (i) a plurality of longitudinally adjustable members each having a contact end, the plurality of longitudinally adjustable members are positioned near the back side of the flat base plate and are radially aligned about the central axis of the central aperture, wherein the radial position of each contact end can be adjusted relative to the central axis in order to collectively receive and grip an optical eyepiece of an optical device while simultaneously aligning the optical eyepiece with the central aperture, whereby light freely passes from the optical eyepiece through the central aperture; and (ii) a support bracket for each of the longitudinally adjustable members, each support bracket having a threaded opening longitudinally aligned towards the central axis of the central aperture and each longitudinally adjustable member having matching threading, wherein each longitudinally adjustable member is supported and adjusted by threading into corresponding support bracket, whereby the longitudinal position of the contact ends is adjusted by rotating the longitudinal adjustable members either direction in order to move the contact end towards the central axis or away from the central axis.

14. The optical adapter of claim 13, wherein the flat base plate further comprises a front padding for providing a cushion between the mobile media device and the optical adapter; and a back padding for providing a cushion between the mobile media device and the optical eyepiece of the optical device.

* * * * *